(12) United States Patent
Schmitt

(10) Patent No.: US 7,802,733 B2
(45) Date of Patent: Sep. 28, 2010

(54) FLUID DELIVERY CONTROL SYSTEM

(75) Inventor: Randall Paul Schmitt, Clinton Township, MI (US)

(73) Assignee: Masco Corporation of Indiana, Indianapolis, IN (US)

( * ) Notice: Subject to any disclaimer, the term of this patent is extended or adjusted under 35 U.S.C. 154(b) by 702 days.

(21) Appl. No.: 11/650,099

(22) Filed: Jan. 5, 2007

(65) Prior Publication Data

US 2008/0164331 A1    Jul. 10, 2008

(51) Int. Cl.
- G05D 23/13 (2006.01)
- F16K 31/02 (2006.01)
- F16K 11/20 (2006.01)
- F16K 11/16 (2006.01)

(52) U.S. Cl. ............. 236/12.12; 236/12.15; 236/12.17; 251/129.11; 137/607; 137/597

(58) Field of Classification Search ............. 236/12.12, 236/12.15, 12.17; 251/129.11; 137/607, 137/597

See application file for complete search history.

(56) References Cited

U.S. PATENT DOCUMENTS

| | | | |
|---|---|---|---|
| 4,359,186 A | 11/1982 | Kiendl | |
| 4,399,836 A | 8/1983 | de Versterre et al. | |
| 4,406,398 A | 9/1983 | Perkins | |
| 4,420,811 A | 12/1983 | Tarnay et al. | |
| 4,439,654 A | 3/1984 | Bresin et al. | |
| 4,682,728 A * | 7/1987 | Oudenhoven et al. | 236/12.12 |
| 4,688,273 A | 8/1987 | Lyng | |
| 4,688,277 A | 8/1987 | Kakinoki et al. | |
| 4,711,392 A | 12/1987 | Kidouchi et al. | |
| 4,842,191 A | 6/1989 | Bergmann | |
| 4,854,498 A | 8/1989 | Stayton | |
| 4,869,287 A | 9/1989 | Pepper et al. | |
| 4,888,834 A | 12/1989 | Vago | |
| 4,931,938 A | 6/1990 | Hass | |
| 4,945,943 A | 8/1990 | Cogger | |
| 4,969,598 A | 11/1990 | Garris | |
| 4,981,156 A * | 1/1991 | Nicklas et al. | 137/270 |
| 5,050,062 A | 9/1991 | Hass | |
| 5,092,560 A | 3/1992 | Chen | |
| 5,123,593 A | 6/1992 | Rundle | |
| 5,358,213 A | 10/1994 | Pilolla | |
| 5,397,099 A | 3/1995 | Pilolla | |
| 5,417,404 A | 5/1995 | Varden | |
| 5,504,950 A | 4/1996 | Natalizia et al. | |

(Continued)

FOREIGN PATENT DOCUMENTS

DE    3430 176 A1    3/1985

(Continued)

OTHER PUBLICATIONS

Precision MIL Style RV2, Precision Series N—1 Watt ¼" shaft diameter, undated, 3 pgs.

(Continued)

Primary Examiner—Frantz F. Jules
Assistant Examiner—Travis Ruby
(74) Attorney, Agent, or Firm—Baker & Daniels LLP

(57) ABSTRACT

A fluid delivery control system including a rotatable flow control member to provide a flow control signal to a controller and a rotatable temperature control member to provide a temperature control signal to a controller.

15 Claims, 7 Drawing Sheets

U.S. PATENT DOCUMENTS

| | | | |
|---|---|---|---|
| 5,755,262 A | 5/1998 | Pilolla | |
| 5,868,311 A | 2/1999 | Cretu-Petra | |
| 5,879,559 A | 3/1999 | Schreiner et al. | |
| 5,944,255 A | 8/1999 | Shirmohamadi | |
| 6,003,170 A | 12/1999 | Humpert et al. | |
| 6,056,201 A | 5/2000 | Ta | |
| 6,341,389 B2 | 1/2002 | Philipps-Liebich et al. | |
| 6,341,731 B1 | 1/2002 | Knapp | |
| 6,351,603 B2 | 2/2002 | Waithe et al. | |
| 6,446,875 B1 | 9/2002 | Brooks et al. | |
| 6,629,645 B2 | 10/2003 | Mountford et al. | |
| 6,676,024 B1 | 1/2004 | McNerney et al. | |
| 6,705,534 B1 | 3/2004 | Mueller | |
| 6,758,242 B2 | 7/2004 | Jones et al. | |
| 6,802,335 B2 | 10/2004 | Jones et al. | |
| 6,874,535 B2 | 4/2005 | Parsons et al. | |
| 6,879,863 B2 | 4/2005 | Mueller et al. | |
| 6,883,541 B2 | 4/2005 | Hwang | |
| 6,962,168 B2 | 11/2005 | McDaniel et al. | |
| 2006/0231636 A1 | 10/2006 | Schmitt | |
| 2006/0231637 A1 | 10/2006 | Schmitt | |
| 2006/0231638 A1 | 10/2006 | Belz et al. | |
| 2007/0001018 A1 | 1/2007 | Schmitt et al. | |

FOREIGN PATENT DOCUMENTS

| | | |
|---|---|---|
| DE | 3407 796 A1 | 9/1985 |
| GB | 2 143 343 | 2/1985 |
| GB | 2 270 858 | 3/1994 |
| JP | 63-037411 | 2/1998 |
| KR | 10-1989-001016 | 4/1989 |

OTHER PUBLICATIONS

Aqualisa Products Limited, "ilux Bath with wall mounted spout," downloaded on Jul. 28, 2009 from http://www.aqualisa.co.uk/Our-products/Browse-showers-by-range/ilux-Digital2/ilux-Bath/, 2 pgs., Westerham, Kent, UK.

* cited by examiner

FLUID DELIVERY CONTROL SYSTEM

BACKGROUND AND SUMMARY OF THE INVENTION

The present invention relates generally to a fluid delivery control system. More particularly, the present invention relates to an electronic control system including a dual analog operator interface for controlling the temperature and flow rate of water delivered in a shower.

Manual shower controls including separate rotary handles or knobs for controlling the temperature and flow rate of water are known in the art. For example, the Monitor 1700 Series shower controls available from Delta Faucet Company include a pressure balanced shower control valve with mechanical coupling to a temperature control handle and a flow control handle. The operation of the handles of such a valve is generally considered to be intuitive and simple.

It is well known to replace mechanical controls for shower valves with electronics. However, such electronic shower controls sometimes present an unfamiliar and confusing interface to the operator. As such, users often prefer more traditional user interfaces.

Accordingly, it is desirable to provide an electronic user interface for use with an electrically operable control valve, while maintaining a familiar and traditional visual appearance and user friendly operation.

According to an illustrative embodiment of the present disclosure, a fluid delivery control system includes a first fluid control valve, a first actuator operably coupled to the first fluid control valve, and a controller in communication with the first actuator. A flow control member is in communication with the controller, and a temperature control member is in communication with the controller. The flow control member is supported for rotation about a rotational axis and is configured to provide a flow control signal to the controller in response to rotation. The temperature control member is supported for rotation about the rotational axis and is configured to provide a temperature control signal to the controller in response to rotation relative to the flow control member. The controller is configured to cause the first actuator to adjust a fluid flow rate in response to the flow control signal and to adjust a fluid temperature in response to the temperature control signal.

According to a further illustrative embodiment of the present disclosure, a flow control member is supported for rotation, and a flow potentiometer is operably coupled to the flow control member and configured to generate a flow control signal in response to relative rotation of the flow control member. The fluid delivery control system further includes a temperature control member supported for rotation relative to the flow control member, and a temperature potentiometer operably coupled to the temperature control member and configured to generate a temperature control signal in response to relative rotation of the temperature control member.

According to another illustrative embodiment of the present disclosure, a fluid delivery control system includes a mounting member, a flow control handle supported by the mounting member, and a temperature control handle supported by the mounting member. An outer shaft adapter is operably coupled to the flow control handle, and an inner shaft operator is operably coupled to the temperature control handle. A flow input detector is supported within, and operably coupled to, the outer shaft adapter for providing a flow control signal. A temperature input detector is supported by the outer shaft adapter and is operably coupled to the inner shaft operator for providing a temperature control signal.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which.

DETAILED DESCRIPTION OF THE DRAWINGS

Figure 1:
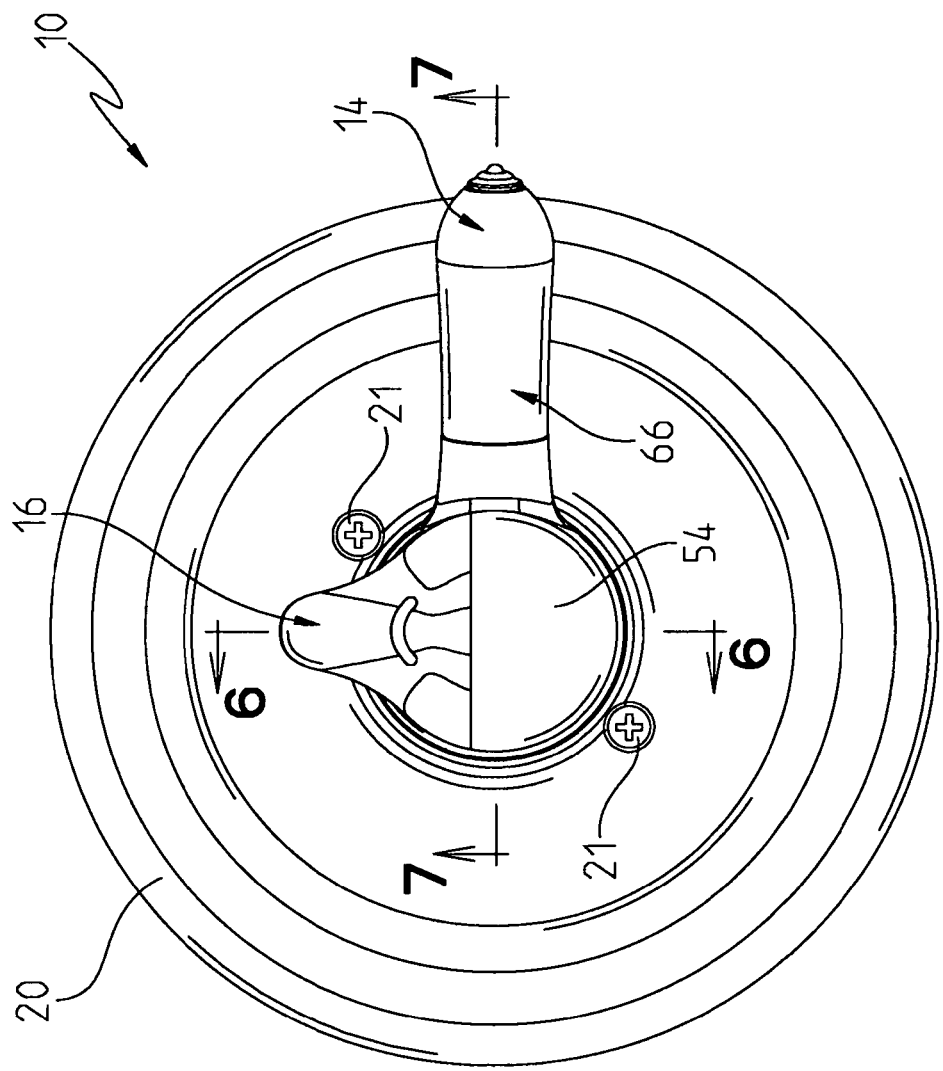
FIG. 1 is a front view of an illustrative user interface and escutcheon for use with a fluid delivery control system.
Figure 2:
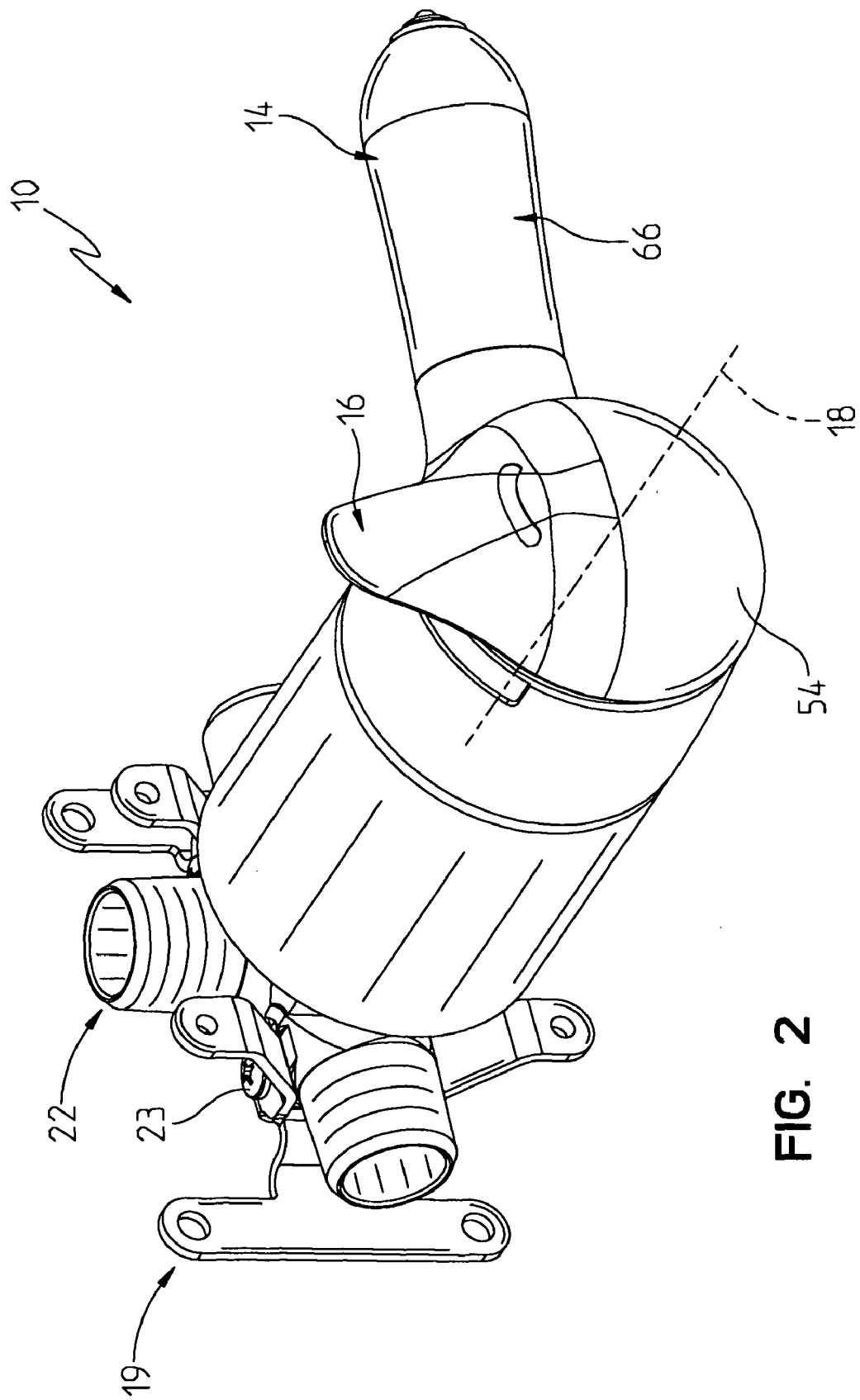
FIG. 2 is a perspective view of the user interface of FIG. 1.
Figure 3:
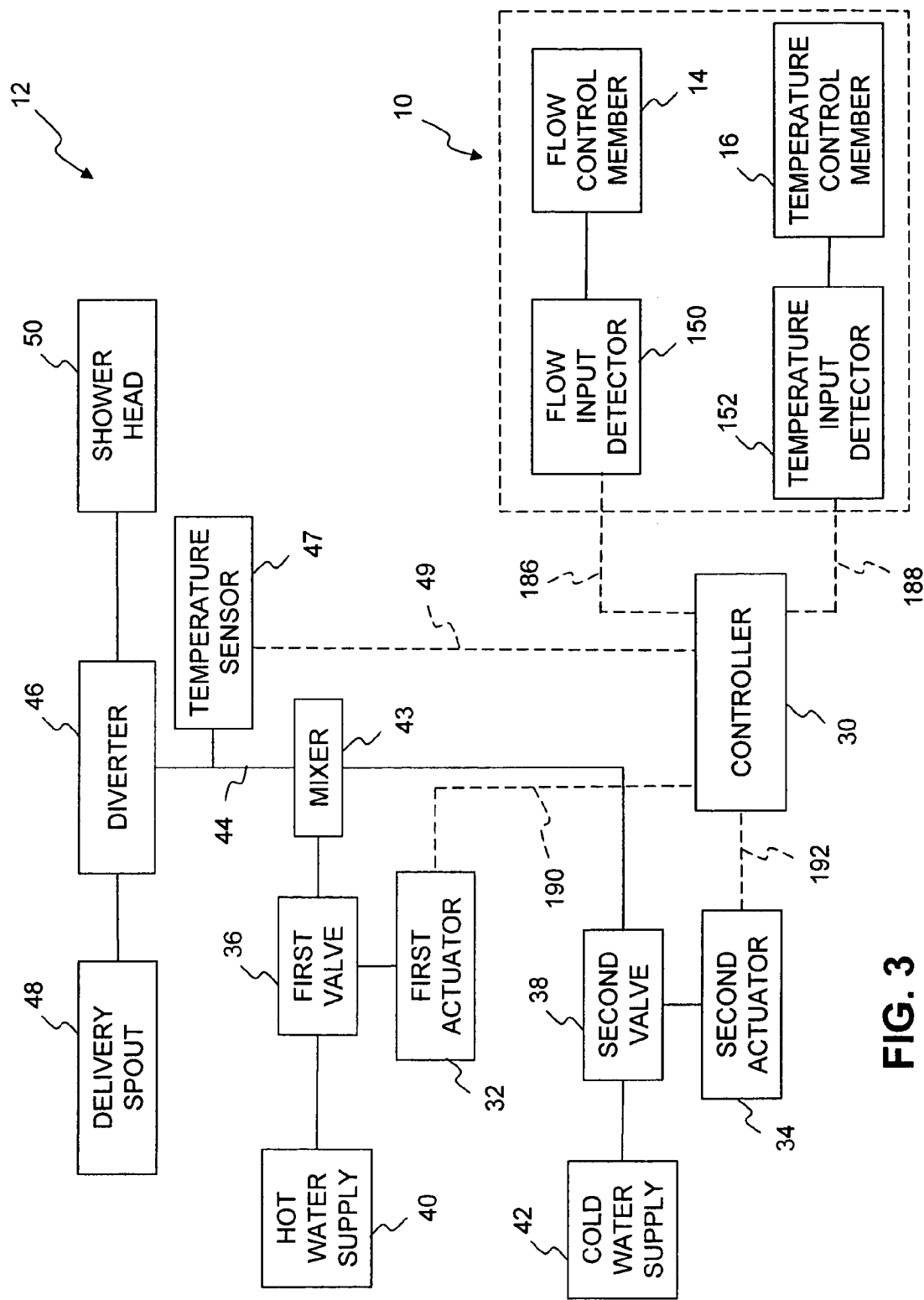
FIG. 3 is a block diagram of an illustrative fluid delivery control system.

Referring initially to FIGS. 1-3, an illustrative dual analog user interface 10 is shown for use with a fluid delivery control system 12. The user interface 10 illustratively includes a first, or flow control member, illustratively a knob or handle 14, and a second, or temperature control member, illustratively a knob or handle 16. As detailed further herein, the first handle 14 is configured to control water flow and is rotatable about a longitudinal axis 18 over a range of approximately 90 degrees from an off position to a maximum flow position. The second handle 16 is rotatable relative to the first handle 14 in order to control temperature by establishing a temperature setpoint throughout a 180 degree rotation from a maximum cold position to a maximum hot position.

Figure 4:
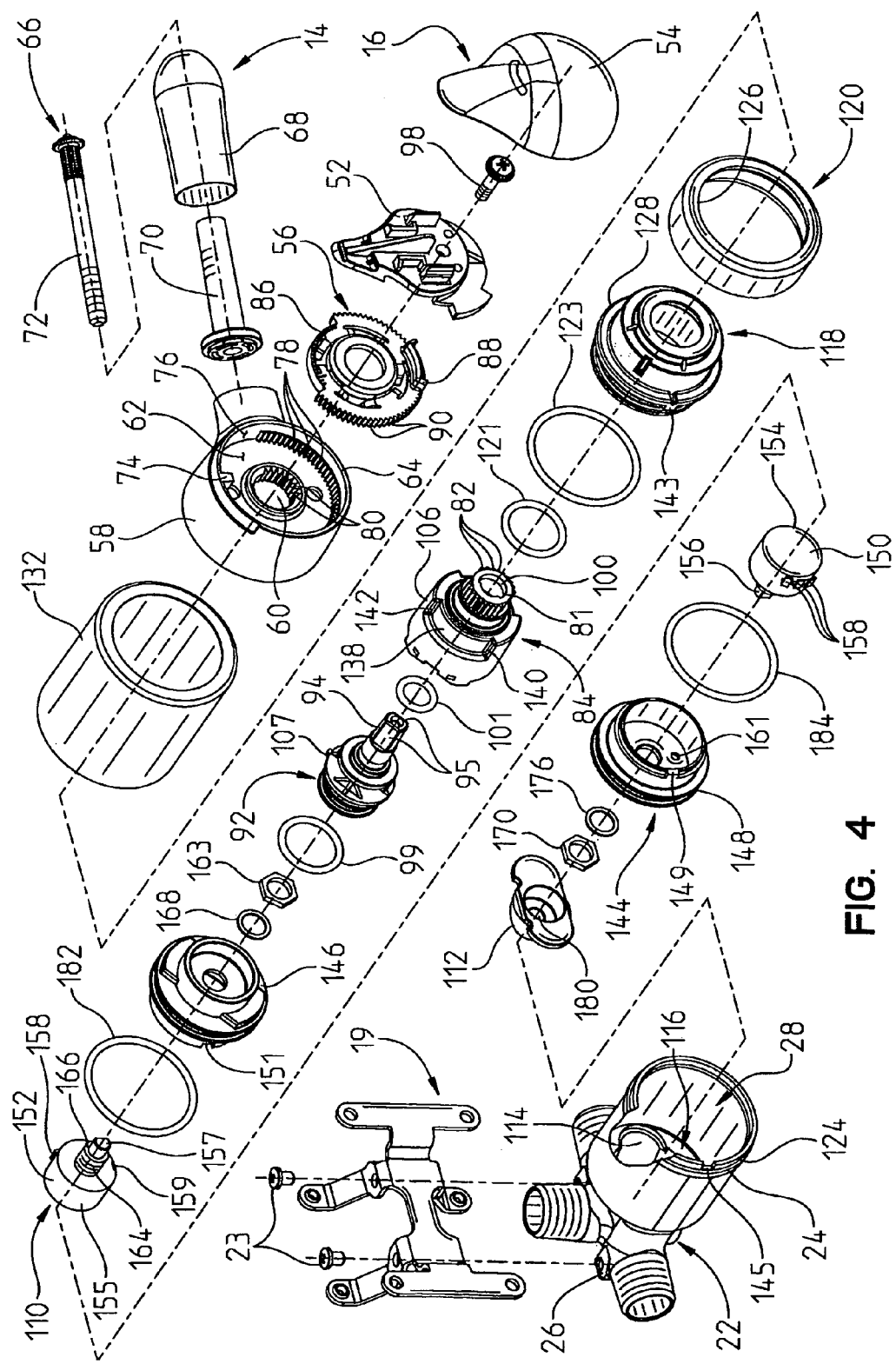
FIG. 4 is a front exploded perspective view of the user interface of FIG. 2, with a partial cut-away of the mounting member.

As shown in FIG. 1, an escutcheon 20 may surround the user interface 10 and is configured to be supported by a wall (not shown), illustratively through a mounting bracket 19 using conventional fasteners, such as screws 21. A mounting member 22 supports the first and second handles 14 and 16 (FIG. 2) and may be secured to the mounting bracket 19 through conventional fasteners, such as screws 23. The mounting bracket 19, in turn, may be secured to studs within the wall in a manner known in the art. The mounting member 22 of the illustrative embodiment comprises a conventional valve body including a cylindrical wall 24 extending from a base 26 to define a chamber 28 (FIG. 4). The illustrative embodiment mounting member 22 is defined by a valve body for convenience and ease of retrofits. Such conventional valve bodies are well-known and widely available and may be readily modified for use with the present invention. It should be noted that water does not pass through the valve body when utilized as mounting member 22. Further, other mounting members 22 may be readily substituted therefor.

With further reference to FIG. 3, the fluid delivery control system 12 illustratively comprises a shower control system including a controller 30 in electrical communication with the user interface 10. In one illustrative embodiment, the controller 30 is in electrical communication with first and second actuators 32 and 34. The first actuator 32 is operably coupled to a first valve 36, while the second actuator 34 is operable coupled to a second valve 38. The first valve 36 is in fluid communication with a hot water supply 40 and the second valve 38 is in fluid communication with a cold water supply 42. The controller 30 controls operation of the first actuator 32 which, in turn, controls the first valve 36 to adjust the amount of hot water flowing therethrough. Similarly, the controller 30 controls the second actuator 34 which adjusts the second valve 38, thereby controlling the amount of cold water flowing therethrough. Illustratively, the first and second actuators 32 and 34 comprise electrically operable devices, such as conventional electric motor solenoids. Fluid flowing through the first and second valves 36 and 38 is supplied to an outlet line 44, illustratively through a fluid mixer 43. The fluid mixer 43 may be of the type detailed in U.S. patent application Ser. No. 11/109,282, filed Apr. 19, 2005, or U.S. patent application Ser. No. 11/109,283, filed Apr. 19, 2005, the disclosures of which are expressly incorporated by reference herein. The outlet line 44 is illustratively in fluid communication with a conventional diverter 46, which is configured to direct fluid flow to either a conventional delivery spout 48 or to a conventional shower head 50. A temperature sensor 47 may be provided in thermal communication with the fluid passing through the outlet line 44. The temperature sensor 47 may provide a fluid temperature feedback signal 49 to the controller 30 in a manner similar to that disclosed in U.S. patent application Ser. No. 11/109,281, filed Apr. 19, 2005, the disclosure of which is expressly incorporated by reference herein.

While separate first and second valves 36 and 38, and associated actuators 32 and 34 are illustrated, it should be appreciated that a single mixing valve and actuator may be substituted therefor.

With reference now to FIGS. 4-7, the temperature control member 16 includes a body portion 52 and a cover 54. A rotational limit stop 56 is positioned intermediate the body portion 52 and the flow control member 14. Flow control member 14 includes a body 58 having a central opening 60, a base surface 62 extending radially outwardly from the central opening 60, and a perimeter lip 64 projecting upwardly and surrounding the base surface 62 (FIG. 4). An arm 66 extends outwardly from the body 58 and includes a blade 68 coupled to a support 70 by a spindle 72. A cold temperature stop 74 extends inwardly from the inner surface 76 of the perimeter lip 64. Also along the inner surface 76 of the perimeter lip 64 are a plurality of engaging ridges 78. The engaging ridges 78 extend from the cold temperature stop 74 partially around the inner circumference of the perimeter lip 64. It is possible for the engaging ridges 78 to extend entirely around the inner surface 76 of the perimeter lip 64.

The central opening 60 contains a plurality of ridges or splines 80 around its perimeter, and is sized so as to matingly engage a valve sprocket 81 including teeth or splines 82 extending from the top of a connector 84. As the flow control handle 14 is placed upon the connector 84, the teeth 82 around the valve sprocket 81 engage the mating ridges 80 of the flow control handle 14, thereby allowing the flow control handle 14 to adjust the connector 84 by rotating the flow control handle 14.

The rotational limit stop 56 is sized to be received within the perimeter lip 64 of the flow control knob 14. The rotational limit stop 56 comprises a substantially circular disk 86 including a hot temperature stop 88. Adjacent the stop 88, and running partially around the outer circumference, are a plurality of teeth 90. As may be appreciated, the stop 88 may be rotationally positioned within the flow control body 58, thereby changing the relative position of the hot temperature stop 88. In the illustrated embodiment of the drawings, the temperature handle 16 is permitted to rotate approximately 180 degrees from the cold temperature stop 74 to the hot temperature stop 88. This relative angular rotation may be varied depending upon the relative positioning of the rotational limit stop 56 within the flow control body 58.

Additional details regarding the rotational limit stop 56 are provided in U.S. Pat. No. 6,758,242 to Jones et al., which is expressly incorporated by reference herein.

An inner shaft operator 92 is received with the connector 84 and includes an upwardly extending connecting shaft 94 having a pair of flats 95. The connecting shaft 94 is received within an opening 96 of the body portion 52 of the temperature control handle 16. Cooperating flats 97 of the opening 96 prevent relative rotation between the shaft 94 and the body portion 52. A conventional fastener 98, such as a screw, may be threadably received within the connecting shaft 94, thereby securing the temperature control handle 16 to the inner shaft operator 92.

Annular seals, illustratively o-rings 99 and 101, are provided intermediate the inner shaft operator 92 and the connector 84. The o-rings 99 and 101 provide a fluid seal between the inner shaft operator 92 and the connector 84 while providing a selective coupling therebetween. More particularly, outer surfaces of the o-rings 99 and 101 frictionally engage the inner shaft operator 92 and the connector 84 to provide a rotational coupling or lock which may be released by the application of sufficient rotational force or torque to the temperature control handle 16.

Figure 5:
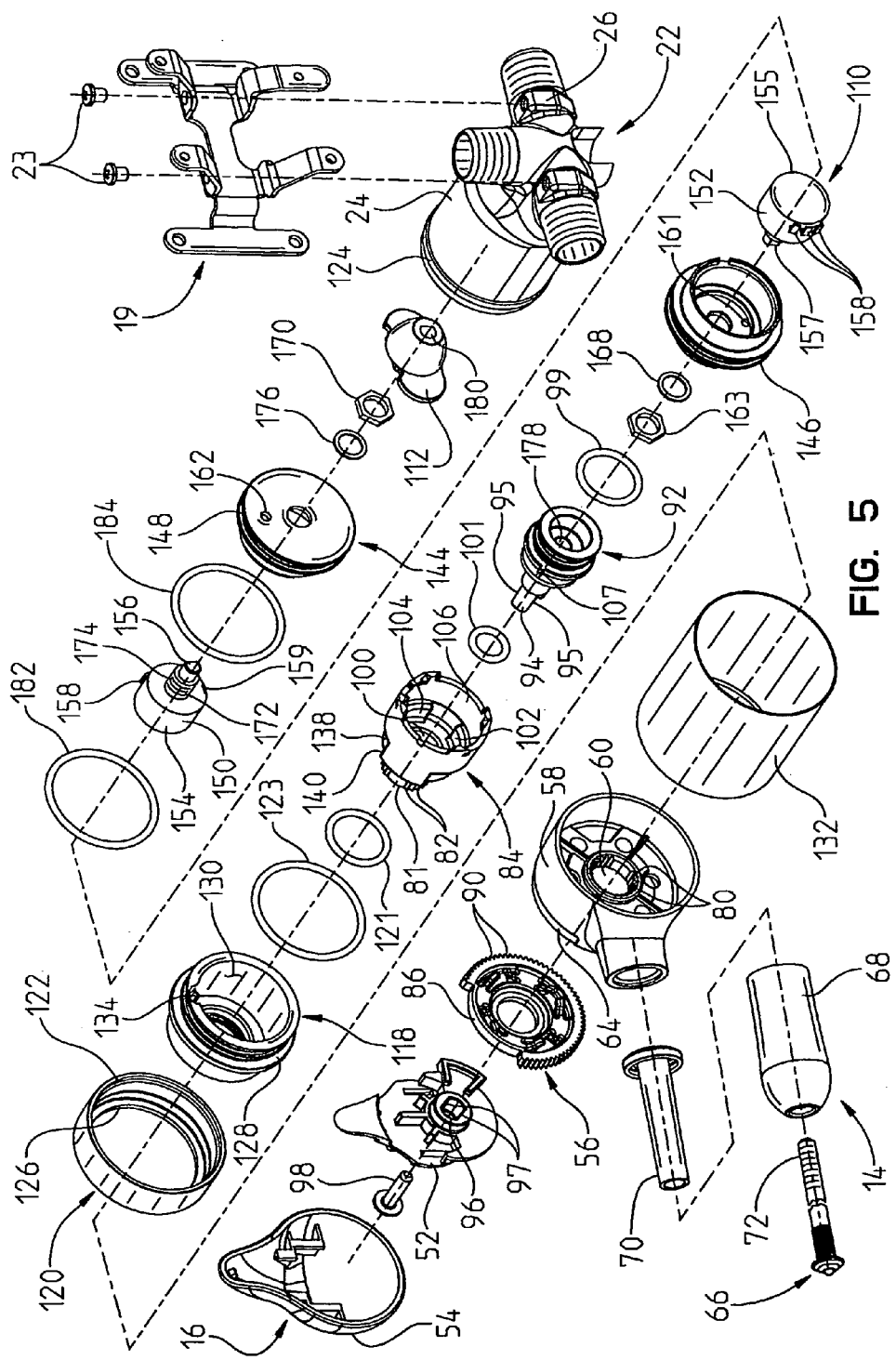
FIG. 5 is a rear exploded perspective view similar to FIG. 4, with a partial cut-away of the outer cap.

The connecting shaft 94 extends through an opening 100 formed within the connector 84. Limit stops 102 and 104 formed inside the side wall 106 of the connector 84 may limit the rotation of the inner shaft operator 92 to approximately 180 degrees (FIG. 5). More particularly, a pin 107 supported by the inner shaft operator 92 is configured to engage the limit stops 102 and 104.

With further reference to FIGS. 4-7, an electrical sensor module 110 is supported within the mounting member 22 by a support 112 received within a recess 114 in a lower surface 116 of the mounting member 22. An outer cap 118 is received over the connector 84 and is secured within the mounting member 22 by a bonnet 120 which is threadably received thereon. A seal, illustratively an o-ring 121, is positioned between the outer cap 118 and the connector 84. Similarly, a seal illustratively an o-ring 123 is positioned intermediate the outer cap 118 and the wall 24 of mounting member 22. Moreover, the bonnet 120 includes internal threads 122 which engage external threads 124 formed on the mounting member 22. A lip 126 on the bonnet 120 engages an annular ring 128 on the outer cap 118 thereby securing it in position. An inner retaining surface 130 on the outer cap 118 engages the connector 84 thereby securing it in position. An outer trim sleeve 132 may be received over the bonnet 120 and the mounting member 22 to provide for an aesthetically pleasing appearance.

The outer cap 118 includes an internal tab 134 (FIG. 5) which extends radially inwardly from inner surface 130 and is configured to ride within a slot 138 extending approximately 90 degrees around the perimeter of the connector 84. More particularly, the tab 134 is configured to engage with opposing stop tabs 140 and 142 formed on the connector 84, thereby limiting rotation to approximately 90 degrees (FIG. 4). As mentioned before, the connector 84 is rotationally fixed to the flow control handle 14 and, as such, limits the rotation of the flow control handle 14 to approximately 90 degrees.

Figure 7:
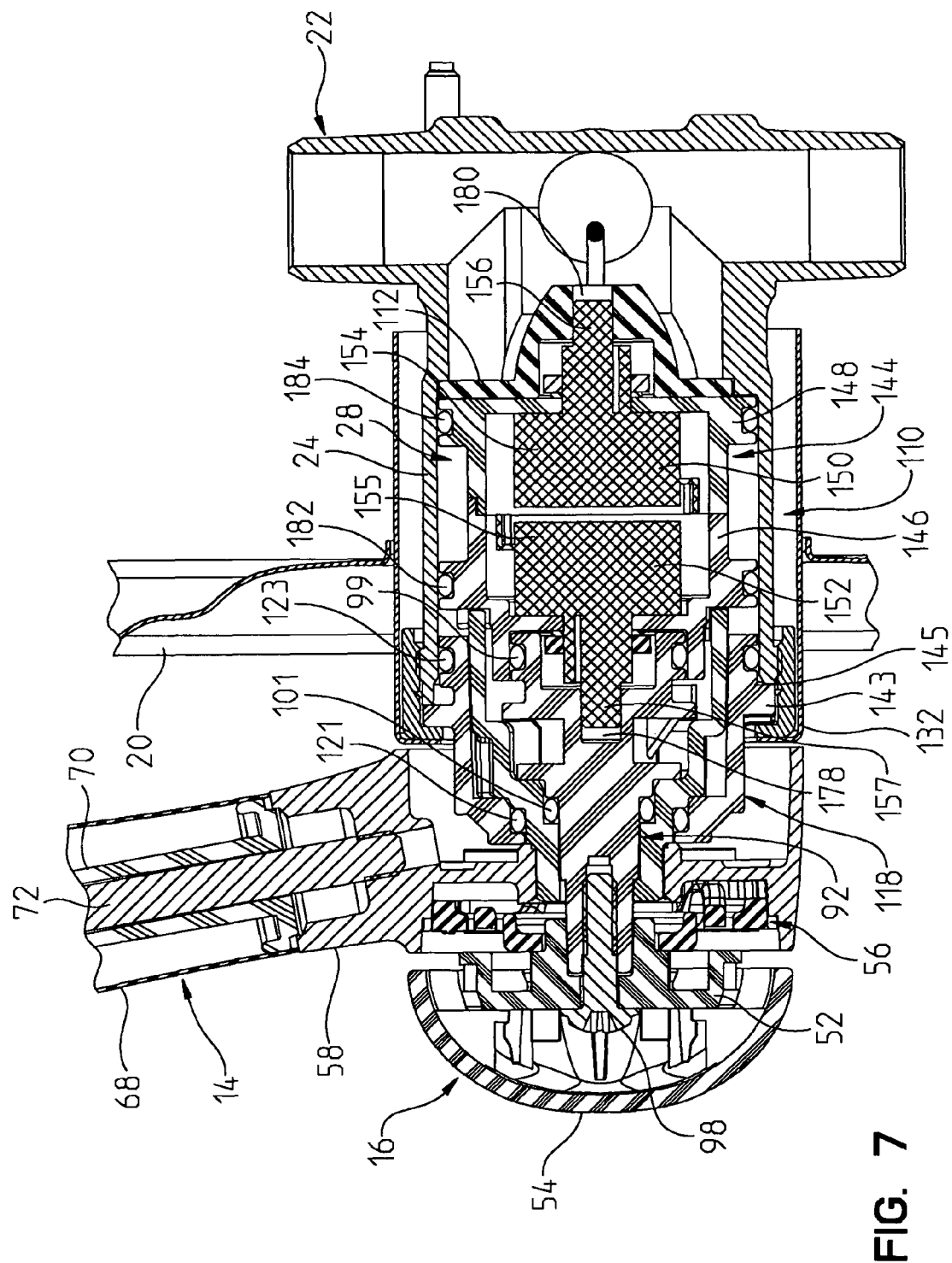
FIG. 7 is a cross-sectional view of the illustrative user interface taken along line 7-7 of FIG. 1.

Referring to FIGS. 4 and 7, the annular ring 128 of outer cap 118 supports an external protrusion or tab 143 which is configured to be received within a mating slot 145 formed in the wall 24 of mounting member 22. Engagement between tab 143 and slot 145 prevents the outer cap 118 from rotating in response to rotation of the connector 84.

The electrical sensor module 110 includes an outer shaft adapter or housing 144 having an outer shaft upper adapter 146 and an outer shaft lower adapter 148 which are fixed together, illustratively through an adhesive or epoxy, to provide a moisture proof seal therebetween. A tab 149 supported by the outer shaft lower adapter 148 is configured to be received within a slot 151 formed within the outer shaft upper adapter 146 for proper alignment (FIG. 4). A flow input detector 150 and a temperature input detector 152 are illustratively received within the housing 144 defined by the outer shaft adapters 146 and 148. In the illustrative embodiment, the input detectors 150 and 152 each comprise a potentiometer including a body 154, 155 and a shaft 156, 157, respectively, supported for rotation relative to the body 154, 155. The bodies 154 and 155 each include a tab 159 configured to be received within a blind opening 161 in adapters 146 and 148, respectively. In one illustrative embodiment, the potentiometers 150 and 152 comprise MIL style RV2 potentiometers and, more particularly, Precision Series N potentiometers. It should be appreciated that other sensors or encoders may be substituted for the potentiometers 150 and 152.

Figure 6:
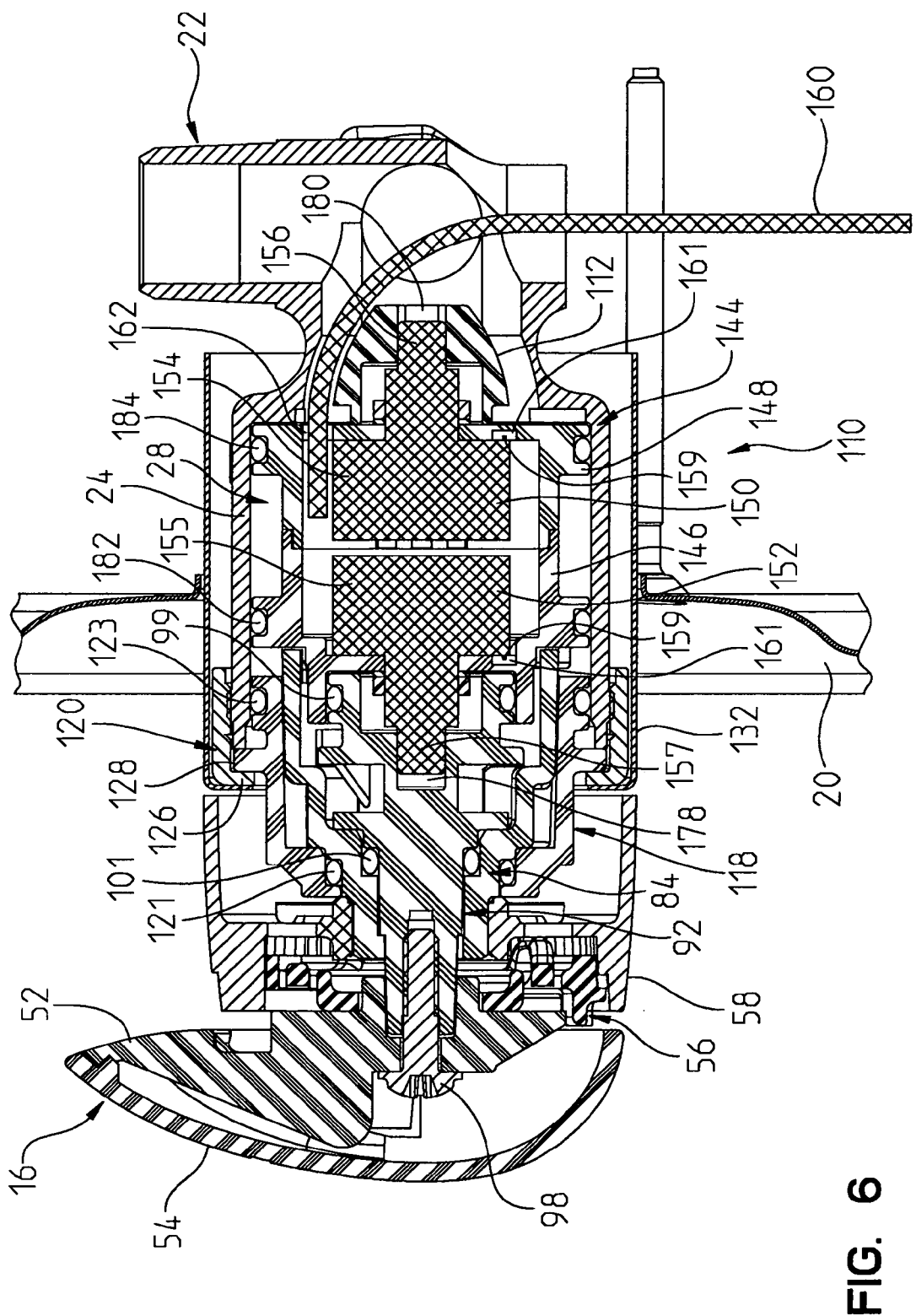
FIG. 6 is a cross-sectional view of the illustrative user interface taken along line 6-6 of FIG. 1.

Each potentiometer 150 and 152 illustratively includes a plurality of contacts 158 which are connected by wires 160 to the controller 30 (FIG. 6). An opening 162 is formed within the outer shaft lower adapter 148 to receive the wires 160. The opening 162 is then sealed with a moisture-proof sealant to provide a moisture proof seal between the wires 160 and the adapter 148. The temperature potentiometer 152 is fixed to the outer shaft upper adapter 146 through a nut 162 engaging threads 164 supported on a bushing 166 extending from the body 155. A seal 168, illustratively an o-ring, is provided to seal around the bushing 166. Similarly, the flow potentiometer 150 is secured to the outer shaft lower adapter 148 through a nut 170 engaging threads 172 formed on a bushing 174 of the body 154. A seal 176, illustratively an o-ring, is also provided for a seal around the bushing 174. The shaft 157 of the temperature potentiometer 152 is received within a lower opening 178 formed within the inner shaft operator 92. Both the shaft 157 of the temperature potentiometer 152 and the opening 178 of the inner shaft operator 92 are D-shaped thereby preventing relative rotation therebetween. The shaft 156 of the flow potentiometer 150 is received within an opening 180 formed in the support 112. The shaft 156 of the flow potentiometer 150 and the opening 180 of the support 112 are also D-shaped, thereby preventing relative rotation therebetween.

Annular seals, illustratively o-rings 182 and 184 are provided intermediate the wall 24 of mounting member 22 and the outer shaft upper adapter 146 and the outer shaft lower adapter 148, respectively. The o-rings 182 and 184 provide a fluid seal between the housing 144 and the mounting member 22 while providing a selective coupling therebetween. More particularly, outer surfaces of the o-rings 182 and 184 frictionally engage the inner surface of cylindrical wall 24 of mounting member 22 and the outer surface of housing 144 to provide a rotational coupling or lock which may be released by the application of sufficient rotational force or torque to the flow control handle 14.

In operation, the dual-potentiometer sensor module 110 provides two separate analog electrical input signals 186 and 188 to the controller 30 (FIG. 3). In turn, the controller 30 transmits electrical control signals 190 and 192 to the actuators 32 and 34, respectively. The flow signal 186 is independent of the temperature signal 188. The temperature signal 188 maintains a mechanical presets for temperature limits throughout the entire 180 degree maximum rotation. The flow signal 186 is variable throughout the entire 90 degree rotation range from an off position to an on maximum flow position. The temperature signal 188 does not change with a change in flow signal 186. In other words, the temperature signal 188 is mechanically maintained, at any preset position, as the flow signal 186 is adjusted through its range.

Within the housing 144 of module 110, each potentiometer body 154, 155 is constrained and each potentiometer shaft 156, 157 is free to rotate. As a user rotates the temperature control handle 16, the inner shaft operator 92 rotates therewith in opposition to the frictional force of the o-rings 99 and 101. The inner shaft operator 92 thereby causes the shaft 157 of the temperature potentiometer 152 to rotate, as the body 155 is fixed in position within the housing 144 of the module 110. Temperature control signal 188 is thereby sent to the controller 30. The controller 30 subsequently establishes a temperature setpoint and controls the water flow through valves 36 and 38 to provide fluid to outlet 44 having a temperature substantially equal to the setpoint as illustratively measured by the temperature sensor 47.

As a user rotates the flow control handle 14, the connector 84 rotates due to the engagement of the splines 80, 82. The connector 84 causes the outer housing 144 of the control module 110 to rotate since they are rotationally coupled, thereby causing the body 154 of the flow potentiometer 150 to rotate. However, the shaft 156 of the flow potentiometer 150 is fixed in position within the support 112. As such, the body 154 of the flow potentiometer 150 rotates relative to the shaft 156. Flow control signal 186 is thereby sent to the controller 30. The controller 30 subsequently controls operation of the first and second valves 36 and 38 through control signals 190 and 192 to adjust the flow to the output line 44.

As the flow potentiometer 150 is rotated with the housing 144, the temperature potentiometer 152 is also rotated. However, due to frictional engagement with the o-rings 99 and 101, inner shaft operator 92 rotates with the connector 84 and the housing 144, such that there is no relative rotation between the shaft 157 and the body 155 of the temperature potentiometer 152. As such, rotation of the volume control handle 14 by itself does not result in relative rotation between the shaft 157 and body 155 of the temperature potentiometer 152 and no resulting temperature control signal is sent to the controller 30.

The rotation of the temperature handle 16 and of the flow handle 14 are combined to produce no relative motion to the temperature potentiometer 152, while producing the desired flow control signal 186 from the flow potentiometer 150. This combination provides one handle 14 for flow control and a separate handle 16 for temperature control. This combination gives the ability to change desired flow without changing temperature and at the same time the ability to change desired temperature without changing flow.

It may be appreciated that the user interface 10 may be located remotely from the hot and cold water supply lines. Thereby the user interface 10 may be located conveniently in locations away from water pipes. The interface 10 may be supported on a wall with only the need for a small hole and electrical cable routing to the controller 30. While the mounting member illustrated is a modified valve body, other mounting members may be easily substituted therefor. However retrofitting existing valve bodies provides for convenient installation.

Although the invention has been described in detail with reference to certain preferred embodiments, variations and modifications exist within the spirit and scope of the invention as described and defined in the following claims.

The invention claimed is:

1. A fluid delivery control system comprising:
   a first fluid control valve;
   a first electric actuator operably coupled to the first fluid control valve;
   a controller in electrical communication with the first electric actuator;
   a user interface including a flow control member and a temperature control member configured for manual movement by a user;
   the flow control member in electrical communication with the controller, the flow control member supported for rotation about a rotational axis and configured to provide a flow control signal to the controller in response to rotation;
   the temperature control member in electrical communication with the controller, the temperature control member coaxially aligned with the flow control member, supported for rotation about the rotational axis, and configured to provide a temperature control signal to the controller in response to rotation relative to the flow control member; and
   wherein the controller is configured to cause the first electric actuator to adjust a fluid flow rate in response to the flow control signal and to adjust a fluid temperature in response to the temperature control signal.

2. The fluid delivery control system of claim 1, further comprising:
   a second fluid control valve;
   a second electric actuator operably coupled to the second fluid control valve; and
   wherein the first fluid control valve is in fluid communication with a hot water supply line and the second fluid control valve is in fluid communication with a cold water supply line, the controller is configured to cause the first electric actuator and the second electric actuator to cooperate in adjusting the fluid temperature in response to the temperature control signal and to cause the first electric actuator and the second electric actuator to cooperate in adjusting the fluid flow rate in response to the flow control signal.

3. The fluid delivery control system of claim 2, wherein the first electric actuator and the second electric actuator each comprise an electric motor.

4. The fluid delivery control system of claim 1, wherein the temperature control member is concentrically positioned radially inwardly from the flow control member.

5. The fluid delivery control system of claim 1, further comprising:
   a flow rotational position detector operably coupled to the flow control member and configured to provide the flow control signal in response to rotation of the flow control member; and
   a temperature rotational position detector operably coupled to the temperature control member and configured to provide the temperature control signal in response to rotation of the temperature control member.

6. The fluid delivery control system of claim 5, wherein the flow rotational position detector and the temperature rotational position detector each comprises a potentiometer.

7. The fluid delivery control system of claim 5, further comprising:
   an outer shaft adapter operably coupled to the flow control member and the flow rotational position detector;
   an inner shaft adapter operably coupled to the temperature control member and the temperature rotational position detector; and
   wherein the flow rotational position detector and the temperature rotational position detector are supported radially within the outer shaft adapter.

8. The fluid delivery control system of claim 1, wherein the temperature control member is configured to selectively rotate within the flow control member.

9. A fluid delivery control system comprising:
   a flow control member supported for rotation by manual input from a user;
   a flow potentiometer operably coupled to the flow control member and configured to generate an electrical flow control signal in response to rotation of the flow control member relative thereto;
   a temperature control member supported for rotation relative to the flow control member by manual input from a user, the temperature control member being coaxially aligned with the flow control member; and
   a temperature potentiometer operably coupled to the temperature control member and configured to generate an electrical temperature control signal in response to rotation of the temperature control member relative thereto.

10. The fluid delivery control system of claim 9, further comprising:
    a fluid delivery device; and
    a controller in communication with the temperature potentiometer and the flow potentiometer, the controller being configured to control a fluid temperature at the fluid delivery device in response to the temperature control signal and to control a fluid flow rate at the fluid delivery device in response to the flow control signal.

11. The fluid delivery control system of claim 10, further comprising:
    a first fluid control valve in fluid communication with a hot water supply line;
    a first electric actuator operably coupled to the first fluid control valve;
    a second fluid control valve in fluid communication with a cold water supply line;
    a second electric actuator operably coupled to the second fluid control valve; and
    wherein the controller is configured to cause the first electric actuator and the second electric actuator to cooperate in controlling the fluid temperature in response to the temperature control signal and to cause the first electric actuator and the second electric actuator to cooperate in controlling the fluid flow rate in response to the flow control signal.

12. The fluid delivery control system of claim 11, wherein the first electric actuator and the second electric actuator each comprise an electric motor.

13. The fluid delivery control system of claim 9, wherein the temperature control member is concentrically positioned relative to the flow control member.

14. The fluid delivery control system of claim 9, further comprising:

an outer shaft adapter operably coupled to the flow control member and the flow potentiometer;
an inner shaft adapter operably coupled to the temperature control member and the temperature potentiometer; and
wherein the temperature potentiometer and the flow potentiometer are supported within the outer shaft adapter.

15. The fluid delivery control system of claim 9, wherein:
the flow potentiometer and the temperature potentiometer each includes a body and a shaft supported for rotation relative to the body;
rotation of the flow control member relative to the flow potentiometer causes the body of the flow potentiometer to rotate relative to the shaft of the flow potentiometer; and
rotation of the temperature control member relative to the temperature potentiometer causes the shaft of the temperature potentiometer to rotate relative to the body of the temperature potentiometer.

\* \* \* \* \*